US008479803B2

(12) United States Patent
Lim et al.

(10) Patent No.: US 8,479,803 B2
(45) Date of Patent: Jul. 9, 2013

(54) EVAPORATOR EQUIPPED WITH COLD RESERVING PART

(75) Inventors: Hong-Young Lim, Daejeon (KR); Dae Bok Keon, Daejeon (KR); Tae Young Park, Daejeon (KR)

(73) Assignee: Halla Climate Control Corp., Daejeon (KR)

( * ) Notice: Subject to any disclaimer, the term of this patent is extended or adjusted under 35 U.S.C. 154(b) by 1264 days.

(21) Appl. No.: 12/300,561

(22) PCT Filed: May 17, 2007

(86) PCT No.: PCT/KR2007/002408
§ 371 (c)(1),
(2), (4) Date: Nov. 12, 2008

(87) PCT Pub. No.: WO2007/133052
PCT Pub. Date: Nov. 22, 2007

(65) Prior Publication Data
US 2009/0120624 A1    May 14, 2009

(30) Foreign Application Priority Data
May 17, 2006  (KR) .................. 10-2006-0044078
May 17, 2007  (KR) .................. 10-2007-0047881

(51) Int. Cl.
F28D 17/00     (2006.01)
F28D 19/00     (2006.01)
F25B 39/02     (2006.01)

(52) U.S. Cl.
USPC .............................................. 165/10; 62/515

(58) Field of Classification Search
USPC ............................................. 165/4, 10; 62/515
See application file for complete search history.

(56) References Cited

U.S. PATENT DOCUMENTS

| | | | | |
|---|---|---|---|---|
| 3,773,031 A | * | 11/1973 | Laing et al. | 165/10 |
| 3,894,395 A | * | 7/1975 | Laing | 165/10 |
| 4,170,261 A | * | 10/1979 | Laing et al. | 165/10 |
| 4,346,569 A | * | 8/1982 | Yuan | 165/10 |
| 4,403,645 A | * | 9/1983 | MacCracken | 165/10 |
| 4,924,935 A | * | 5/1990 | Van Winckel | 165/10 |
| 5,005,371 A | * | 4/1991 | Yonezawa et al. | 165/10 |
| 5,277,038 A | * | 1/1994 | Carr | 165/10 |
| 5,553,662 A | * | 9/1996 | Longardner et al. | 165/10 |
| 5,944,089 A | * | 8/1999 | Roland | 165/10 |
| 6,470,703 B2 | * | 10/2002 | Wada et al. | 62/515 |

(Continued)

FOREIGN PATENT DOCUMENTS

| | | |
|---|---|---|
| JP | 10-141820 | 5/1998 |
| JP | 2000-205777 | 7/2000 |
| JP | 2005-001408 | 1/2005 |
| KR | 10-2007-0067848 | 6/2007 |

*Primary Examiner* — Ljiljana Ciric
(74) *Attorney, Agent, or Firm* — Lowe Hauptman Ham & Berner, LLP

(57) ABSTRACT

An evaporator includes a plurality of tubes stacked in a row and each of the tubes has a pair of plates coupled with each other. Each of the pair of plates includes a pair of refrigerant passages in an air flow direction at opposite sides thereof. The evaporator further has a cold reserving part between the refrigerant passages for storing a cold reserving material; a plurality of fins formed between the tubes; a tank including an upper tank respectively communicated with upper portions of the pair of refrigerant passages and a lower tank respectively communicated with lower portions of the pair of refrigerant passages; and an inlet pipe and an outlet pipe formed at the tank.

13 Claims, 7 Drawing Sheets

U.S. PATENT DOCUMENTS

| | | | |
|---|---|---|---|
| 6,568,205 B2 * | 5/2003 | Bureau et al. | 62/515 |
| 7,085,483 B2 * | 8/2006 | Terashima et al. | 165/10 |
| 7,891,412 B2 * | 2/2011 | Loup et al. | 165/10 |
| 7,905,110 B2 * | 3/2011 | Reich et al. | 165/10 |
| 2002/0088248 A1 * | 7/2002 | Bureau et al. | 62/515 |

* cited by examiner (a)

(b)

EVAPORATOR EQUIPPED WITH COLD RESERVING PART

RELATED APPLICATIONS

The present application is based on, and claims priority from, KR Application Number 10-2006-0044078, filed May 17, 2006, KR Application Number 10-2007-0047881, filed May 17, 2007, and PCT application No. PCT/KR07/002408, filed May 17, 2007, the disclosures of which are hereby incorporated by reference herein in their entireties.

TECHNICAL FIELD

The present invention relates to an evaporator, and more particularly, to a cold reserving part equipped evaporator in which the cold serving part is disposed between refrigerant passages formed of tubes so as to increase the cooling performance and thus to save energy.

BACKGROUND ART

In the automobile industry, research studies are carried out to improve mileage according to a growing global interest in the environment and energy, and other studies of downsizing, high-functioning and reducing a weight are also carried out to satisfy various consumers' demands. In particular, various research and developments of a hybrid vehicle using engine power and electric energy are being increased.

The hybrid vehicle mainly selects an idle stop/go system in which an engine thereof is automatically stopped when the vehicle is stopped during waiting the signal and then restarted by operating a transmission. However, an air conditioner of the hybrid vehicle is operated by the engine. If the engine is stopped, a compressor is also stopped and thus a temperature of an evaporator is increased. Therefore, there is a problem that a driver may feel inconvenience. Further, since refrigerant in the evaporator can be easily vaporized at a room temperature, the refrigerant is vaporized during a short period while the compressor is stopped. Although the engine is restarted and the compressor and evaporator are operated again, the vaporized refrigerant should be compressed and liquefied again. Therefore, there are other problems that it takes long time for supplying a chilly wind and energy consumption is increased.

Meanwhile, in order to improve a cooling efficiency, there was proposed Japanese Patent Laid-Open No. 2000-205777 entitled "Thermal energy storage heat exchanger" which is shown in FIG. 1. As shown in FIG. 1, in the thermal energy reserving heat exchanger, a heat exchanging medium passage 191$e$ through which a heat exchanging medium is flowed and a thermal energy reserving material chamber 191$f$, 191$f'$ for storing thermal energy reserving material are integrally formed with a dual structural tube 191, and a passage 194 for fluid which is heat-exchanged with the heat exchanging medium is formed outside the dual structural tube 191.

However, in the thermal energy reserving heat exchanger as shown in FIG. 1, since the dual structural tube 191 is formed by coupling a plurality of plate materials, coupling defects are occurred with increasing frequency and it is difficult to fabricate the tube. Further, if the coupling defects are occurred, the heat exchanging medium and the thermal energy reserving material may be mixed. Furthermore, it is difficult to find a portion where the coupling defects are occurred.

Moreover, since the passage through which the heat exchanging medium is flowed is formed outside the dual structural tube and the thermal energy reserving material chamber for storing the thermal energy reserving material is formed inside the dual structural tube, it is facile to store the cold of the heat exchanging medium in the thermal energy reserving material. However, since the air passing through the outside of the dual structural tube is contacted with the thermal energy reserving material chamber, there is other problem that a rate of heat transfer of the heat exchanging medium is lowered. And since fins disposed outside the dual structural tube are just contacted with the thermal energy reserving material chamber and is not directly connected to the heat exchanging medium passage, the efficiency in heat exchange is lowered.

DISCLOSURE

Technical Problem

An object of the present invention is to provide an evaporator equipped with a cold reserving part which can prevent sharply increasing of a temperature in a vehicle by using the cold reserved in the cold reserving part when an engine is stopped and which can rapidly reserve the cold when a compressor is operated again, thereby minimizing energy and time for air cooling.

Another object of the present invention is to provide an evaporator which has a simple structure so as to be fabricated facilely as well as to downsize a vehicle and reduce a weight thereof and which can increase a contact surface with refrigerant so as to effectively improve a cooling and cold reserving ability, thereby increasing the entire energy efficiency.

TECHNICAL SOLUTION

To achieve the above objects, an evaporator of the present invention, in which a plurality of tubes 30, in which a pair of plates 10 forming independent refrigerant passages 11$a$ and 11$b$ are respectively coupled to both sides thereof, are laminated in a row, and a tank 40 communicated with the tube 30 is formed at an upper or lower side of the tube 30, and the tank 40 is provided with an inlet pipe 31 and an outlet pipe 32, and a plurality of fins 50 are formed between the tubes 30, is characterized in that a cold reserving part 20 for storing a cold reserving material is formed between the refrigerant passages 11$a$ and 11$b$ of the tube 30, and integrally formed with the plate 10.

The cold reserving part 20 is formed in parallel with the refrigerant passage 11$a$, 11$b$, and at least two surfaces of the cold reserving part 20 is contacted with the refrigerant passage 11$a$, 11$b$.

A hole 21, through which the cold reserving material is passed, is formed at an upper or lower side of the cold reserving part 20, and the tank 40 is formed with a cold reserving material charging portion 41 which is communicated with the hole 21 and through which the cold reserving material is charged in the cold reserving part 20, and an air discharging portion 42 through which air remained in the cold reserving part 20 is discharged when the cold reserving material is charged.

The cold reserving material charging portion 41 and the air discharging portion 42 are provided with a cap 43 which is formed with a screw thread at an inside thereof and brazed to the hole 21, and a stopple 44 which is screwed to the screw thread of the cap 43.

Further, The ratio of a width l of the cold reserving part with respect to a width L1+L2 of the refrigerant passage is between the range of 0.3 and 0.5.

The evaporator 60 is a one-tank type evaporator or a four-tank type evaporator, and the plate 10 allows the refrigerant to flow at an upper or lower side of the cold reserving part 20, so that a communicating portion 33 is formed to communicate the refrigerant between the refrigerant passages 11a, 11b.

Further, the evaporator 60 comprises an inlet pipe 31 and an outlet pipe 32 formed at both sides of the tank 40, and the refrigerant introduced through the inlet pipe 31 to the upper tank 40 is passed thorough a first region A1 in which the refrigerant is moved to the lower tank 40 through the refrigerant passage 11b, a second region A2 which is positioned near to the first region A1 and in which the refrigerant moved to the upper tank 40 through the refrigerant passage 11b and a third region A3 in which the refrigerant moved through the communicating portion 33 of the upper tank 40 is moved again to the lower tank 40 through other refrigerant passage 11a, and the refrigerant moved to the lower tank 40 through the third region A3 is moved to the upper tank 40 through the other refrigerant passage 11a and then discharged through a fourth region A4, which is positioned near to the third region A3, and the discharge pipe 32.

A predetermined region of the cold reserving part 20 in the plate 10 forming the communicating portion 33 is removed so that the refrigerant moved from the refrigerant passage 11b to the other refrigerant passage 11a can be smoothly flowed, thereby increasing an upper width of the refrigerant passage 11a, the cold reserving part 20 is formed with a protrusion 22 to be protruded to an inside or outside of a surface thereof adjacent to the refrigerant passage 11a, 11b, and a width l a lower side of the cold reserving part is wider than that of an upper side thereof.

Further, the cold reserving part 20 is integrally formed with the plate 10.

DESCRIPTION OF DRAWINGS

The above and other objects, features and advantages of the present invention will become apparent from the following description of preferred embodiments given in conjunction with the accompanying drawings, in which.

DETAILED DESCRIPTION OF MAIN ELEMENTS

| | |
|---|---|
| 10: | plate |
| 11a, 11b: | refrigerant passage |
| 12: | bead |
| 13: | refrigerant flowing cup |
| 20: | cold reserving part |
| 21: | hole |
| 22: | protrusion |
| 30: | tube |
| 31: | inlet pipe |
| 32: | outlet pipe |
| 33: | communicating portion |
| 40: | tank |
| 41: | cold reserving material charging portion |
| 42: | air discharging portion |
| 43: | cap |
| 44: | stopple |
| 44: | sealing member |
| 50: | fin |
| 60: | evaporator |
| l: | width of cold reserving part |
| a: | width of plate |
| L1, L2: | width of refrigerant passage |

Best Mode

Hereinafter, the embodiments of the present invention will be described in detail with reference to accompanying drawings.

Figure 1:
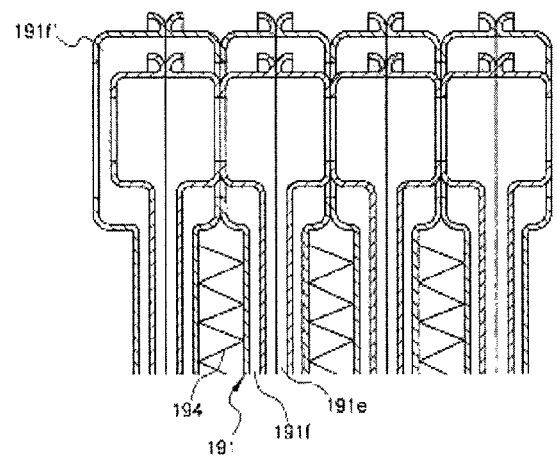
FIG. 1 is a cross-sectional view of a conventional heat exchange equipped with a dual structural tube.
Figure 2:
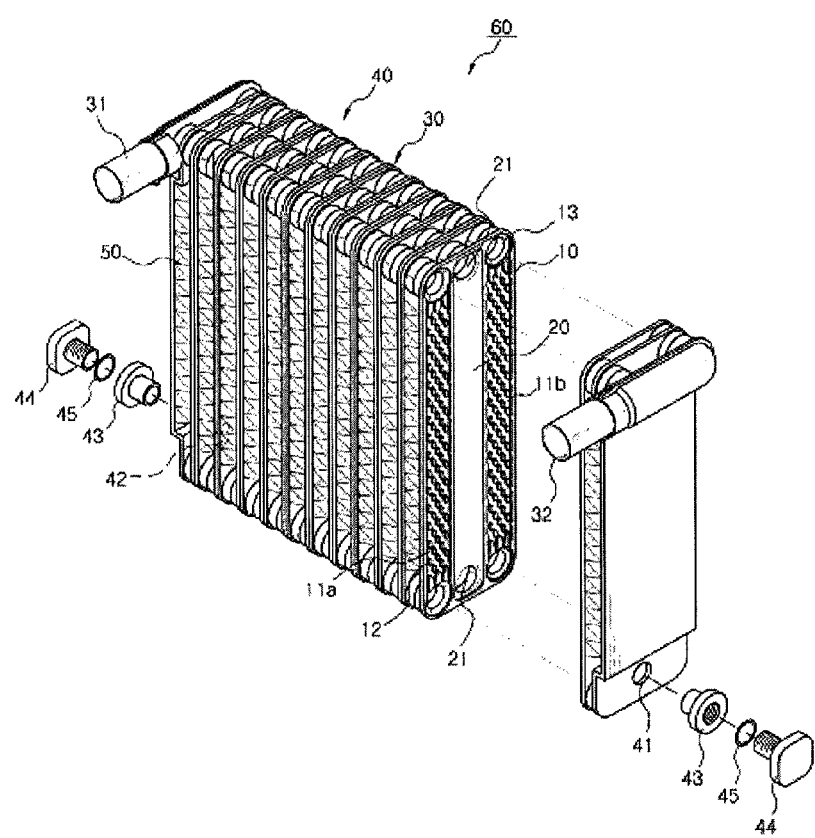
FIG. 2 is a perspective view of a four-tank type evaporator equipped with a cold reserving part according to the present invention.

FIG. 2 is a perspective view of a four-tank type evaporator equipped with a cold reserving part according to the present invention. In the four-tank type evaporator equipped with the cold reserving part 20 according to the present invention, as shown in FIG. 2, a plurality of tubes 30, in which a pair of plates 10 forming independent refrigerant passages 11a and 11b are respectively coupled to both sides thereof, are laminated in a row, and a tank 40 communicated with the tube 30 is formed at an upper and lower side of the tube 30, and the tank 40 is provided with an inlet pipe 31 and an outlet pipe 32, and a plurality of fins 50 are formed between the tubes 30, and the cold reserving part 20 for storing a cold reserving material is formed between the refrigerant passages 11a and 11b of the tube 30.

Further, the tank 40 may be a pipe type extruded tank formed by extrusion molding.

Figure 3:
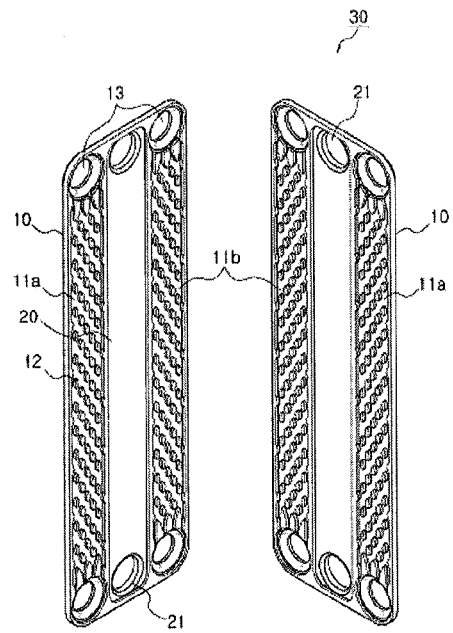
FIG. 3 is an exploded perspective view of a four-tank type evaporator tube equipped with the cold reserving part according to the present invention.

FIG. 3 is an exploded perspective view of the tube 30 of the four-tank type evaporator 60 equipped with the cold reserving part 20 according to the present invention. Both side of the pair of plates 10 form one tube 30 and also form each refrigerant passage 11a, 11b.

Figure 4:
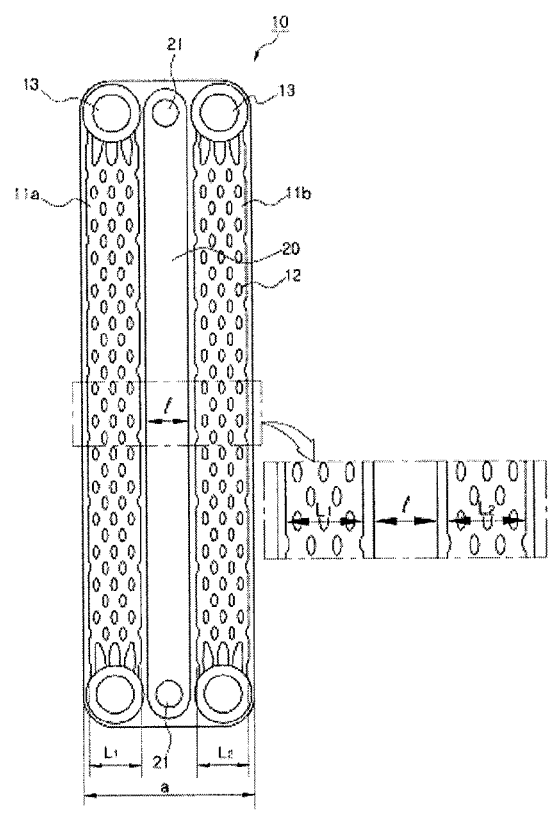
FIG. 4 is a cross-sectional view of a four-tank type evaporator plate equipped with the cold reserving part according to the present invention.

As shown in FIG. 4, the plate 10 of the four-tank type evaporator 60 equipped with the cold reserving part 20 according to the present invention has the independent refrigerant passages 11a and 11b separated by the cold reserving part 20, and beads 12 are formed at the refrigerant passage 11a, 11b so as to increase the heat exchange efficiency. A refrigerant flowing cup 13 is formed at upper and lower sides of the plate 10, and the tank 40 is communicated with the refrigerant flowing cup 13 so that the refrigerant can be introduced.

As shown in drawings, the present invention has a simple structure in which the refrigerant passages 11a, 11b are separated by the cold reserving part 20. Since the cold reserving part 20 is contacted with at least two surfaces or more of the refrigerant passage 11a, 11b and thus the contact area with the refrigerant is increased, it is possible to improve a cold reserving ability by reserving the cold using the almost whole refrigerant. Although the cold reserved in the cold reserving part 20 is used when the engine is stopped, it is possible to provide the excellent air cooling ability. In addition, since a separate reserving space for the cold reserving part 20 is not needed, the evaporator 60 can have a small size and a high efficiency.

Figure 5:
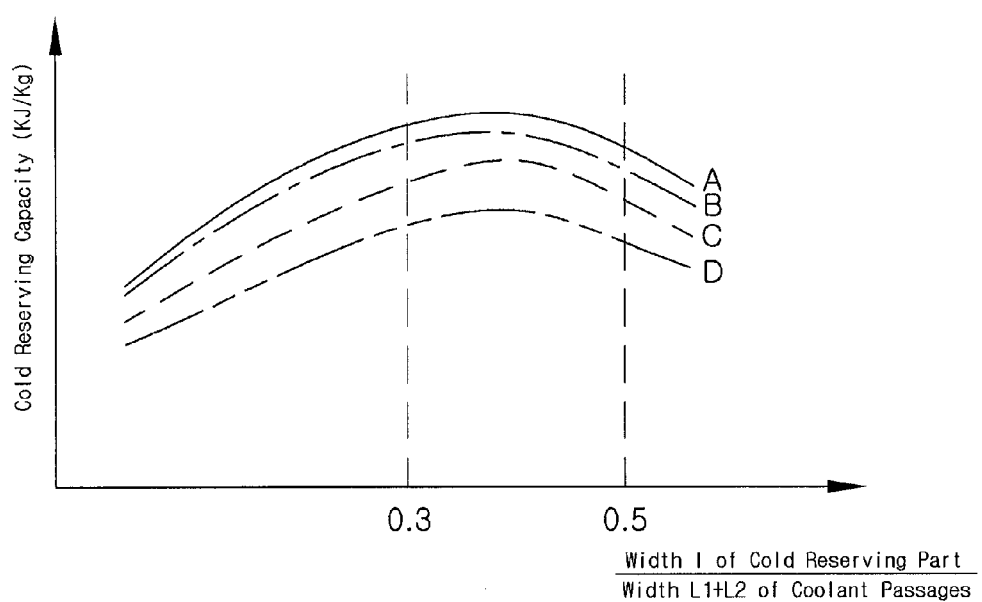
FIG. 5 is a graph of a cold reserving capacity in each area of the cold reserving part of the evaporator with the plate of FIG. 4.

FIG. 5 is a graph of a cold reserving capacity in each area of the cold reserving part 20 of the evaporator 60 with the plate 10 of FIG. 4, and the graph shows the cold reserving capacity (KJ/Kg) according to rpm of the vehicle engine when the plate 10 has a width a of 30-60 mm. An X-axis of the graph in FIG. 5 shows a width l of the cold reserving part 20 with respect to a width L1+L2 of the refrigerant passage adjacent to the cold reserving part 20, and Y-axis shows the cold reserving capacity, and A, B, C and D show each cold reserving capacity of the heat exchanger according to rpm of the vehicle engine.

As shown in FIG. 5, the ratio of a width l of the cold reserving part with respect to a width L1+L2 of the refrigerant passage is between the range of 0.3 and 0.5.

Further, in the case that the width l of the cold reserving part 20 with respect to the width L1+L2 of the refrigerant passage is below 0.3, because the width l of the cold reserving part becomes small and thus an amount of the cold reserving material which is can be stored is reduced, the cold reserving efficiency of the cold reserving part 20 is reduced, and in the case that the width l of the cold reserving part 20 with respect to the width L1+L2 of the refrigerant passage is excess 0.5, because the width L1+L2 of the refrigerant passage becomes small and thus the refrigerant can not flow smoothly, the cold reserving efficiency of the cold reserving part 20 is also reduced. Therefore, in order to maximize the cold reserving efficiency and also allow the refrigerant to flow smoothly, it is preferable that the ratio of a width l of the cold reserving part with respect to the width L1+L2 of the refrigerant passage is between the range of 0.3 and 0.5.

A hole 21, through which the cold reserving material can be moved, may be formed at an upper or lower portion of the cold reserving part 20. FIGS. 3 to 5 show an embodiment that the hole 21 is formed at an upper and lower portion of the cold reserving part 20. The cold reserving material can be moved through the hole 21 according to a volume change of the cold reserving material by a driving status of the vehicle and an external temperature, and also can be charged at one time through a cold reserving material charging portion 41 in the entire cold reserving part 20.

The tank 40 is formed with the cold reserving material charging portion 41 which is communicated with the hole 21 and through which the cold reserving material is charged in the cold reserving part 20, and an air discharging portion 42 through which air remained in the cold reserving part 20 is discharged when the cold reserving material is charged, so that the cold reserving material can be facilely charged through the cold reserving material charging portion 41 and the air discharging portion 42.

In other words, the air discharging portion 42 is formed to prevent that the cold reserving material is not charged in the entire cold reserving part 20 by the air remained in the cold reserving part 20.

The cold reserving material charging portion 41 and the air discharging portion 42 are provided with a cap 43 which is formed with a screw thread at an inside thereof and brazed to the hole 21, and a stopple 44 which is screwed to the screw thread of the cap 43. Therefore, after the cold reserving material is charged in the cold reserving part 20, the cold reserving material charging portion 41 and the air discharging portion 42 are air-tightly closed. In order to further increase the closing effect, a sealing member like an O-ring may be further provided between the cap 43 and the stopple 44.

Figure 6:
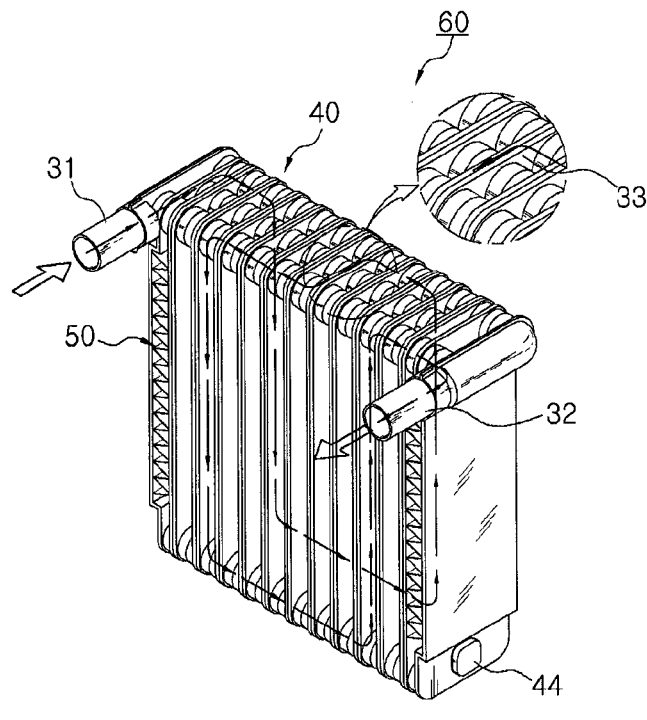
FIGS. 6a and 6b are views showing a refrigerant flow in the four-tank type evaporator with the cold reserving part according to the present invention.
Figure 6:
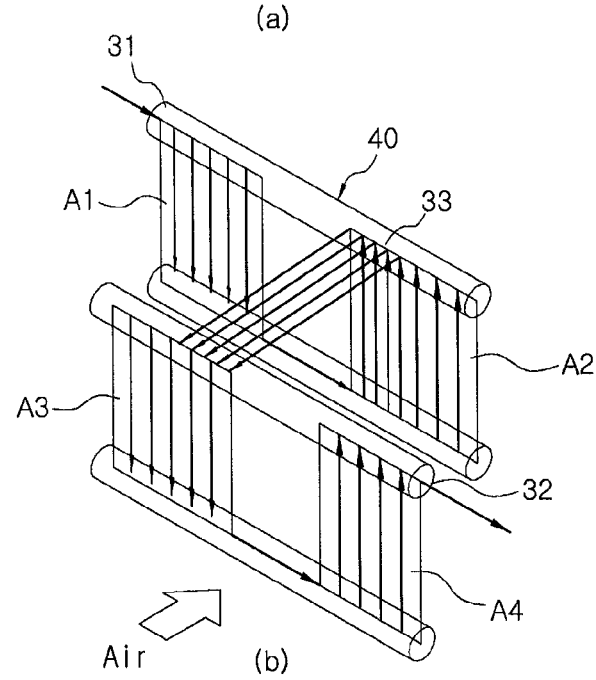

FIGS. 6a and 6b are views showing a refrigerant flow in the four-tank type evaporator 60 with the cold reserving part 20 according to the present invention. The refrigerant flow path may be variously designed according to a position of an internal baffle of the evaporator 60, and FIGS. 6a and 6b are an embodiment of the refrigerant flow path in the four-tank type evaporator 60 with the cold reserving part 20.

According to the four-tank type evaporator 60 according to the embodiment of the present invention, in order to improve an discharging temperature, the refrigerant is introduced to a tank 40 formed at the upper side thereof and moved through the tube 30 to other tank 40 formed at the lower side thereof and then moved again through the tube 30 to the tank 40 to discharge the refrigerant.

Particularly, the four-tank type evaporator 60 with the cold reserving part 20 according to the present invention is provided with the inlet pipe 31 and the outlet pipe 32 at both sides of the tank 40. The refrigerant is introduced through the inlet pipe 31 to the upper tank 40 and passed thorough a first region A1 in which the refrigerant is moved to the lower tank 40 through the refrigerant passage 11b, a second region A2 which is positioned near to the first region A1 and in which the refrigerant moved to the upper tank 40 through the refrigerant passage 11b and a third region A3 in which the refrigerant moved through the communicating portion 33 of the upper tank 40 is moved again to the lower tank 40 through other refrigerant passage 11a, and the refrigerant moved to the lower tank 40 through the third region A3 is moved to the upper tank 40 through the other refrigerant passage 11a and then discharged through a fourth region A4, which is positioned near to the third region A3, and the discharge pipe 32.

As shown in drawings, the four-tank type evaporator 60 with the cold reserving part 20 according to the present invention performs the heat exchange with the cold reserving part 20 and the external fins 50 and does not exert any influence on the existing refrigerant flow in the evaporator 60. Further, since the cold reserving part 20 is formed over an entire length of the refrigerant flow so as to increase the contact surface.

Figure 7:
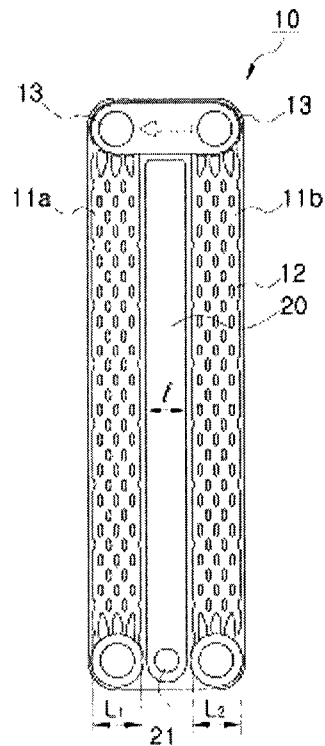
FIG. 7 is a cross-sectional view of the plate constructing a communicating portion of the four-tank type evaporator with the cold reserving part according to the present invention.

FIG. 7 is a cross-sectional view of the plate 10 constructing a communicating portion 33 of the four-tank type evaporator 60 with the cold reserving part 20 according to the present invention. The plate 10 forming the communicating portion 33 as shown in FIG. 7 forms the communication portion between the refrigerant passages 11a and 11b so as to allow the refrigerant to be flowed at an upper or lower area of the cold reserving part 20.

That is, in the four-tank type evaporator 60 according to the present invention, the plate 10 as shown in FIG. 7 is used in an area in which the communicating portion 33, and the plate 10 as shown in FIG. 4 is used in the rest area.

The refrigerant can be moved from one refrigerant passage 11b and to other refrigerant passage 11a through the communication portion 33, and three surfaces of the cold reserving part 20 are covered with the refrigerant, thereby increasing the cold reserving ability.

Figure 8:
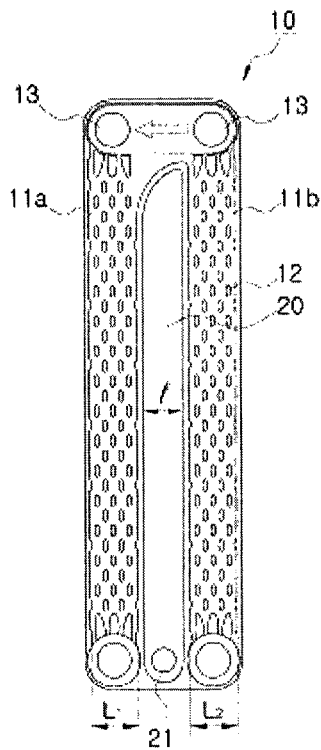
FIG. 8 is a cross-sectional view of another plate constructing the communicating portion of the four-tank type evaporator with the cold reserving part according to the present invention.

FIG. 8 is a cross-sectional view of another plate 10 constructing the communicating portion 33 of the four-tank type evaporator 60 with the cold reserving part 20 according to the present invention. In the plate 10 forming the communicating portion 33, as shown in FIG. 8, a desired region of the cold reserving part 20 may be removed so that the refrigerant moved from the refrigerant passage 11b to the other refrigerant passage 11a can be smoothly flowed, thereby increasing an upper width of the refrigerant passage 11a.

In the case that the refrigerant is moved from one refrigerant passage 11b to other refrigerant passage 11a at a place that the communicating portion 33 is formed, since the refrigerant undergoes an influence of inertial force and gravity, an upper portion of the other refrigerant 11a may be formed to be curved, as shown in FIG. 8, so that the upper width of the upper portion is widened.

Figure 9:
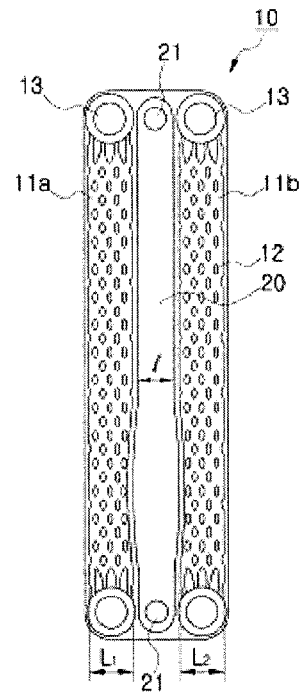
FIG. 9 is a cross-sectional view of yet another plate constructing the communicating portion of the four-tank type evaporator with the cold reserving part according to the present invention.

FIG. 9 is a cross-sectional view of yet another plate 10 constructing the communicating portion 33 of the four-tank type evaporator 60 with the cold reserving part 20 according to the present invention, which is an example that the width 1 of the lower side of the cold reserving part is wider than that of an upper side.

Condensate water formed at a surface of the evaporator 60 and the cold reserving material stored in the cold reserving part 20 is leaned to a lower side by the gravity. Therefore, in order to increase the cold reserving capacity at the lower side, as shown in FIG. 9, the width l of the lower side of the cold reserving part may be wider than that of an upper side.

Figure 10:
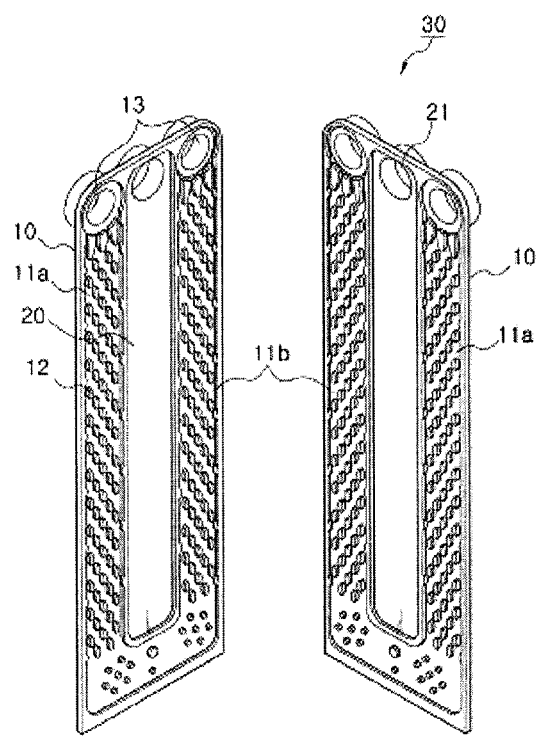
FIG. 10 is an exploded perspective view of an one-tank type evaporator tube equipped with the cold reserving part according to the present invention.
Figure 11:
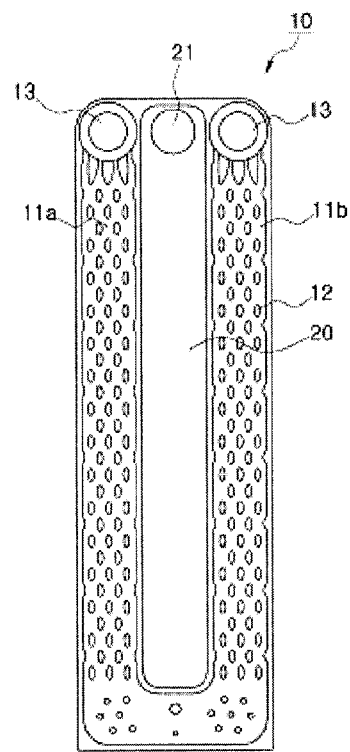
FIG. 11 is a cross-sectional view of an one-tank type evaporator plate equipped with the cold reserving part according to the present invention.

FIG. 10 is an exploded perspective view of an one-tank type evaporator tube 30 equipped with the cold reserving part according to the present invention, and FIG. 11 is a cross-sectional view of an one-tank type evaporator plate 10 equipped with the cold reserving part according to the present invention. The one-tank type evaporator has the same structure as the four-tank type evaporator except that the refrigerant flowing cup 13 and the hole 21 are formed only at the upper or lower side thereof. One pair of right and left plates 10 forms one tube 30 so as to define each refrigerant passage 11a, 11b, and beads 12 are formed at the refrigerant passage 11a, 11b. FIGS. 10 and 11 show an example that the refrigerant flowing cup 13 is formed at the upper side of the plate 10 of the evaporator.

Figure 12:
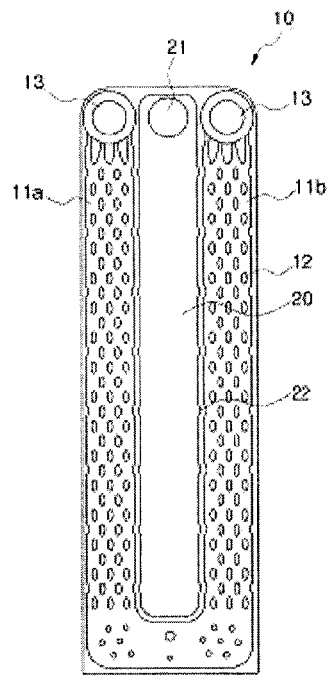
FIG. 12 a cross-sectional view of another one-tank type evaporator plate with the cold reserving part according to the present invention.

FIG. 12 a cross-sectional view of another one-tank type evaporator plate 10 with the cold reserving part 20 according to the present invention, wherein the cold reserving part 20 is provided with a protrusion 22 formed at a surface thereof adjacent to the refrigerant passage 11a, 11b so as to be protruded to an outside.

The protrusion 22 formed at the cold reserving part 20 are formed to be correspondent to the bead formed on the outer surface of the refrigerant passage 11a, 11b so as to increase an efficiency in the heat exchange between the refrigerant in the refrigerant passage 11a, 11b and the cold reserving material in the cold reserving part 20. The protrusion 22 of the cold reserving part 20 may be formed to have other shape which is protruded to an inside.

Further, as shown in FIGS. 2 to 12, it is preferable that the cold reserving part 20 is integrally formed with the plate 10. And the cold reserving part 20 may be fabricated previously and then assembled in the evaporator 60.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

Industrial Applicability

According to the cold reserving part equipped evaporator of the present invention, as described above, since the cold reserving part is provided between the refrigerant passages, it is possible to keep the inside of the vehicle comfortable by using the cold reserved in the cold reserving part when the vehicle engine is stopped, thereby saving time and energy for re-cooling the cold reserving material.

In addition, since the cold reserving part and the refrigerant passage can be integrally formed by using the plate so as to have a simple structure, it is possible to downsize the vehicle and improve the gas mileage and also reduce harmful exhaust gas, thereby reducing environmental pollution.

The invention claimed is:

1. An evaporator, comprising:
    a plurality of tubes stacked in a row, each tube of the plurality of tubes including a pair of plates coupled with each other, each pair of plates defining a pair of refrigerant passages adjacent to each other in an air flow direction and a cold reserving part between the pair of refrigerant passages in the air flow direction for storing a cold reserving material;
    a plurality of fins formed between pairs of tubes of the plurality of tubes;
    a tank including an upper tank in communication with upper portions of the pair of refrigerant passages and a lower tank in communication with lower portions of the pair of refrigerant passages; and
    an inlet pipe and an outlet pipe formed at the tank.

2. The evaporator according to claim 1, wherein the cold reserving part is formed in parallel with the pair of refrigerant passages.

3. The evaporator according to claim 1, wherein at least two surfaces of the cold reserving part contact the pair of refrigerant passages.

4. The evaporator according to claim 1, wherein
    the cold reserving part has an upper side and a lower side, the cold reserving part having a hole at the upper side or the lower side, the hole being adapted to pass the cold reserving material.

5. The evaporator according to claim 4, wherein the tank comprises
    a cold reserving material charging portion in communication with the hole, and wherein the cold reserving material charging portion is adapted to charge the cold reserving material, and
    an air discharging portion, wherein the air discharging portion is adapted to discharge air remaining in the cold reserving part when the cold reserving material is charged.

6. The evaporator according to claim 5, wherein each of the cold reserving material charging portion and the air discharging portion comprises
    a cap which is formed with a screw thread inside the cap and brazed to the hole, and
    a stopple is screwed to the screw thread of the cap.

7. The evaporator according to claim 1, wherein a ratio of a width of the cold reserving part with respect to a sum width of the pair of refrigerant passages is between the range of 0.3 and 0.5.

8. The evaporator according to claim 1, wherein the plates are configured to allow refrigerant to flow at an upper or lower side of the cold reserving part, and the evaporator further comprises a communicating portion configured to communicate the refrigerant between the refrigerant passages.

9. The evaporator according to claim 8, wherein the inlet pipe and the outlet pipe are formed at opposite sides of the upper tank, and the inlet and outlet pipes and the tank define a path including first, second, third, and fourth regions and the communication portion connecting the second region with the third region for passing the refrigerant through the path, the first region is configured to move the refrigerant to the lower tank through the refrigerant passages, the second region is positioned in parallel with the first region in the air flow direction and is configured to move the refrigerant to the upper tank through other refrigerant passages, the third region is configured to move the refrigerant moved through the communicating portion of the upper tank to the lower tank through the refrigerant passages, and the fourth region is configured to move the refrigerant moved to the lower tank through the third region to the upper tank through the other refrigerant passages and then to discharge the refrigerant moved to the upper tank through the outlet pipe, the fourth region being positioned in parallel with the third region in the air flow direction.

10. The evaporator according to claim 9, wherein an upper width of one of the refrigerant passages is larger than a lower width of said refrigerant passage.

11. The evaporator according to claim 1, wherein the cold reserving part comprises a protrusion protruding toward an inside of a surface of the cold reserving part adjacent to the pair of refrigerant passages.

12. The evaporator according to claim 1, wherein a width of a lower side of the cold reserving part is wider than that of an upper side.

13. The evaporator according to claim 11, wherein the cold reserving part comprises a protrusion protruding toward an outside of a surface of the cold reserving part adjacent to one of the pair of refrigerant passages.

* * * * *